No. 771,771. PATENTED OCT. 4, 1904.
E. DYSTERUD.
CLUTCH.
APPLICATION FILED DEC. 28, 1903.
NO MODEL. 2 SHEETS—SHEET 1.

WITNESSES:
J. T. Brophy
Isaac B. Owens

INVENTOR
Emil Dysterud
BY
ATTORNEYS

No. 771,771. PATENTED OCT. 4, 1904.
E. DYSTERUD.
CLUTCH.
APPLICATION FILED DEC. 28, 1903.
NO MODEL. 2 SHEETS—SHEET 2.
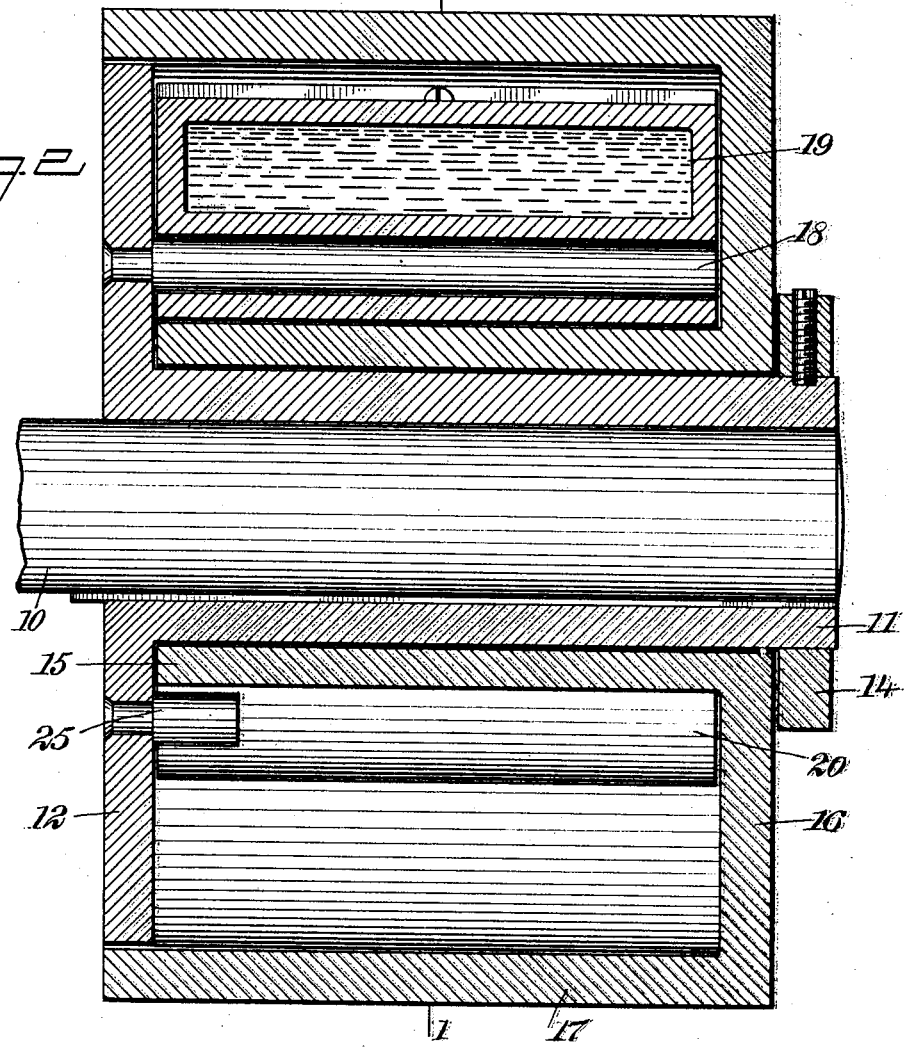
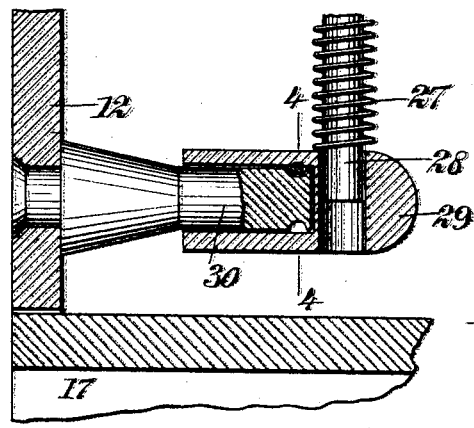
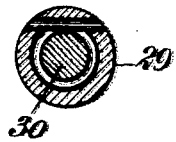
WITNESSES:
J. A. Brophy
Isaac B. Owens
INVENTOR
Emil Dysterud
BY
ATTORNEYS No. 771,771. Patented October 4, 1904.

UNITED STATES PATENT OFFICE.

EMIL DYSTERUD, OF MONTEREY, MEXICO.

CLUTCH.

SPECIFICATION forming part of Letters Patent No. 771,771, dated October 4, 1904.

Application filed December 28, 1903. Serial No. 186,857. (No model.)

*To all whom it may concern:*

Be it known that I, EMIL DYSTERUD, a citizen of the United States, and a resident of Monterey, Mexico, have invented a new and Improved Clutch, of which the following is a full, clear, and exact description.

This invention relates to an improvement in the clutch covered by my prior patent, No. 723,196, dated March 17, 1903.

Broadly, the object of my invention is the same as that set forth in my prior patent; but with the improvement constituting the subject-matter of this application I seek to provide means for more accurately and fully adjusting the parts, and thereby enabling me to time with absolute accuracy the positive action of the clutch. By this means I am able to keep back the action of the clutch until the motive-power machine has attained full speed and then allow the clutch to take hold of the loaded pulley or other part with which it is used—a result which cannot be attained by any prior device known to me.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
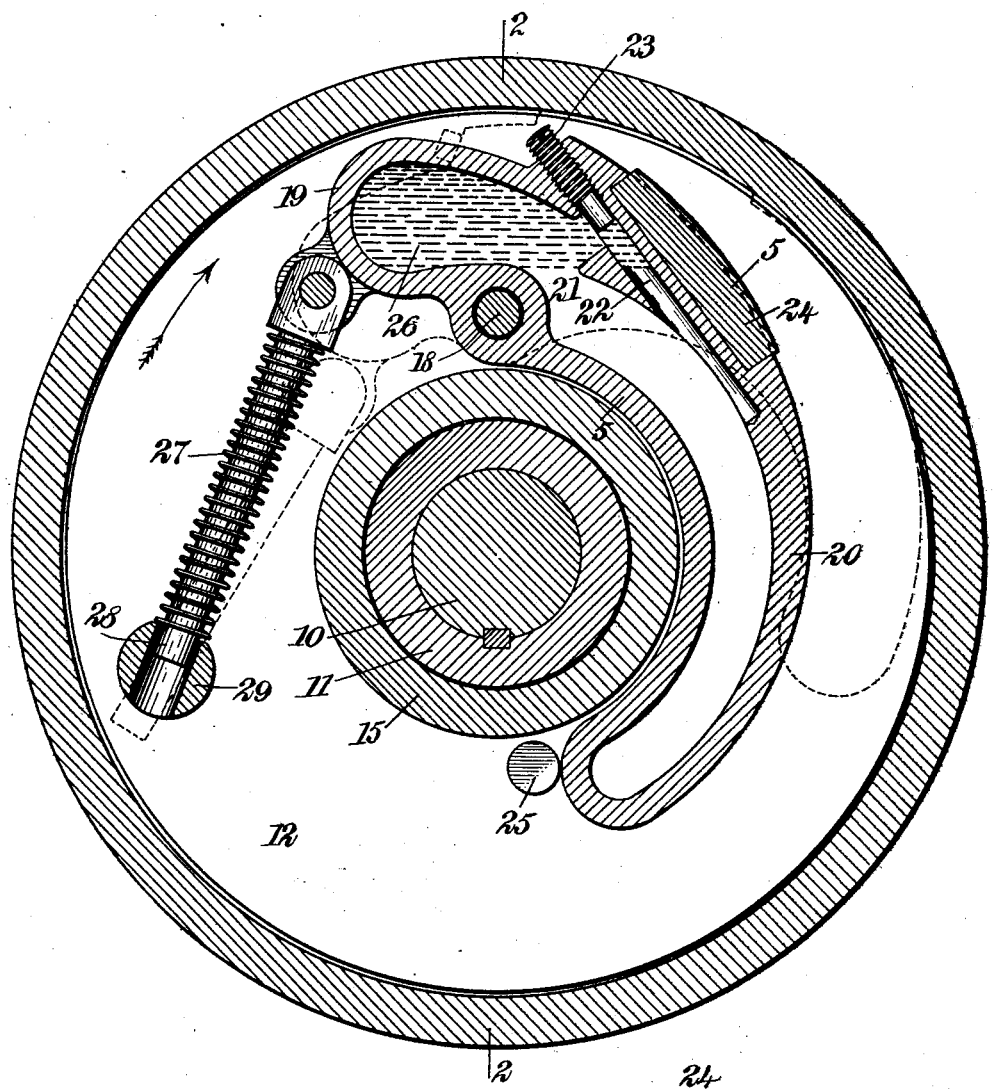
Figure 5:
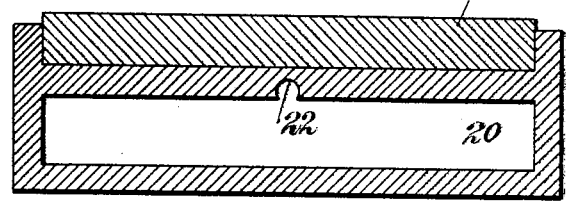

Figure 1 is a section of the invention on the line 1 1 of Fig. 2. Fig. 2 is a section on the line 2 2 of Fig. 1. Fig. 3 is a sectional detail illustrating the manner of mounting the actuating-spring. Fig. 4 is a cross-section on the line 4 4 of Fig. 3, and Fig. 5 is a cross-section on the line 5 5 of Fig. 1.

10 indicates the revoluble driven member, which may be the shaft of an alternating-current motor or any other rotating machine element. Keyed to the driving-shaft 10 is a sleeve 11, carrying at one end a perpendicular web 12 and at the other end a collar 14. Between these parts 12 and 14 and carried loosely on the sleeve 11 is arranged the hub 15 of a pulley, which comprises, in addition to the hub, a web 16 and a face 17. Preferably the parts 12, 16, and 17 are arranged to form, as shown in Fig. 2, a circular case or inclosure, which contains the operative parts of the clutch. The pulley comprising the parts 15, 16, and 17 constitutes the driven member.

18 indicates a pin carried securely by the web 12 and moving, therefore, as a part of the driving member 12. Mounted on this pin is an intermediately-fulcrumed hollow lever comprising a short arm 19 and a long arm 20. The cavities of these arms 19 and 20 communicate with each other by means of a throat 21 and a by-pass 22, the throat lying inward of the by-pass 22, or, in other words, nearer the center of the driving member 10. 23 indicates a regulating-screw, which works in the walls of the said hollow lever and controls the by-pass 22. By adjusting this screw the area of the by-pass may be regulated delicately and at will.

24 indicates a section of wood or other friction material which is adapted when the long arm of the lever moves outward to engage the inner periphery of the face 17 of the pulley and grip the same, the part 24 forming, therefore, one member of the clutch and the pulley-face the other member. The long arm 20 of the lever curves to conform to the hub 15 of the pulley, and 25 indicates a stud carried by the web 12 and serving to limit the inward movement of this arm. Within the hollow lever I arrange a mass of substance 26, which may be fluid, semifluid, or granulated, as desired. I prefer, however, to employ mercury for this purpose.

A spring 27 is provided to hold the lever normally in the position shown in Fig. 1. This spring is arranged to encircle a pin 28, which is pivoted at one end to the short arm of the lever and has the other end freely carried in a guide 29, arranged to turn on a stud 30, carried by the web 12. It will be seen that by this arrangement the spring acts continuously on the lever, and the pivotal mounting of the pin 28 and the turnable mounting of the guide 29 prevent these parts from interfering with the free movement of the lever.

In the practical operation of the invention, assuming the parts to be constructed and arranged as shown and the substance indicated at 26 to be mercury or its equivalent, when the apparatus is at rest the hollow lever will assume the position shown in Fig. 1 and the mercury will gather in that part of the lever which may be lowest. The instant rotation begins the mercury will move to that part of the hollow lever which is farthest from the center of rotation—viz., into the short arm 19 of the lever—the mercury passing principally through the throat 21 and collecting in the arm 19, as indicated in Fig. 1. As the speed of rotation continues the long arm 20, having by reason of its length a greater heft than that of the short arm 19, and the mercury therein will begin to move outward, and as this movement takes place the mercury will then begin to move through the by-pass 22 and collect along the outer side of the long arm 20 of the lever. This movement of the mercury through the by-pass may be accurately regulated by the screw 23. The continually-increasing speed of the driving part will cause the outward movement of the arm 20 and the passage of the mercury thereinto to continue proportionately to the speed, and for most effective operation, particularly with alternating-current electric motors, the adjustment of the parts should be such that when full high speed has been reached the whole of the mass of mercury 26 will have passed into the long arm 20, and by the increased heft thereby given to this arm the arm will be forced so far outward as to clutch the face 24 against the inner periphery of the pulley, and thus connect the driven with the driving element. The parts will then retain this position as long as the predetermined high speed of the driving part continues.

The advantage of the present invention over that disclosed in my prior patent is that by the use of mercury or its equivalent substance and the employment of the by-pass 22 and means for varying the area thereof I am enabled to time the movement of the means for automatically increasing the heft of the lever with absolute accuracy. In this manner I am able to keep back the operation of the clutch until after full high speed has been attained, and this is of greatest advantage, particularly with alternating-current motors, since it avoids the use of heavy starting-currents. With the clutch-lever moving in the direction of the arrow in Fig. 1 the member 20 when it takes hold on the pulley will be wedged against it and the force of the clutch thereby increased. In this case the spring 27 counteracts the strain on the pin 18. The apparatus is simple and effective for the purpose in hand and may be applied at small expense to a motor or engine of any sort. In connection with the clutching action it will be observed that the engagement is gradual and easy, as contradistinguished from a sudden and therefore violent connection. By arranging the levers to swing on axes parallel with the shaft I provide a compact and simple structure and take full advantage of the centrifugal force. The drawings show only one lever. In practice this will be balanced by another or by a suitably-located weight, as will be understood.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of driving and driven members, and a clutch coacting therewith and comprising a centrifugally-actuated hollow arm, a substance arranged to move in the arm, and means projecting into the interior of the arm for controlling the movement of said substance.

2. The combination of the driving and driven parts, a clutch coacting therewith and including a centrifugally-actuated hollow arm formed with a throat and a by-pass therein, and means for regulating the area of the by-pass.

3. The combination of a driving and driven part and a clutch coacting therewith and including an intermediately-fulcrumed hollow lever, the hollow arms of which communicate with each other by means of a throat and a by-pass, and means for controlling the area of the by-pass.

4. The combination of a driving and driven part and a clutch coacting therewith and including an intermediately-fulcrumed hollow lever, the hollow arms of which communicate with each other by means of a throat and a by-pass, means for controlling the area of the by-pass, and a spring for yieldingly holding the lever in inactive position.

5. The combination of a driving and driven part and a clutch coacting therewith and including an intermediately-fulcrumed hollow lever, the hollow arms of which communicate with each other by means of a throat and a by-pass, and means for controlling the area of the by-pass, said means for controlling the by-pass comprising a screw working in the walls of the lever and having one end arranged to enter the by-pass.

6. The combination of the driving and driven parts, a clutch coacting therewith and including a centrifugally-actuated hollow arm formed with a throat and a by-pass therein, and means for regulating the area of the by-pass, said means for regulating the area of the by-pass having a screw working in the walls of the lever and having one end arranged to enter the by-pass.

7. The combination of driving and driven members and a clutch coacting therewith and comprising a centrifugally-actuated hollow member, a substance arranged to move in the member, and means within the hollow member for controlling the movement of said substance.

8. The combination of driving and driven parts, a clutch coacting therewith and including a centrifugally-actuated hollow member formed with a flange and a by-pass therein, the by-pass lying outward from the flange, and means for regulating the area of the by-pass.

In testimony whereof I have signed my name to this specification in the presence of two subscribing witnesses.

EMIL DYSTERUD.

Witnesses:
   Isaac B. Owens,
   Everard Bolton Marshall.